United States Patent [19]

Schmitz et al.

[11] Patent Number: 4,487,078
[45] Date of Patent: Dec. 11, 1984

[54] CLAMPING-FORCE TRANSDUCER FOR ROTATING CLAMPING DEVICES

[75] Inventors: Karl-Heinz Schmitz, Meerbusch; Josef Steinberger, Düsseldorf, both of Fed. Rep. of Germany

[73] Assignee: Paul Forkardt GmbH & Co. KG, Düsseldorf, Fed. Rep. of Germany

[21] Appl. No.: 425,035

[22] Filed: Sep. 27, 1982

[30] Foreign Application Priority Data

Dec. 23, 1981 [DE] Fed. Rep. of Germany ....... 3151048

[51] Int. Cl.³ .............................................. G01L 5/16
[52] U.S. Cl. ............................... 73/862.06; 73/862.54
[58] Field of Search ................... 73/856, 859, 862.06, 73/862.54, 862.65

[56] References Cited

U.S. PATENT DOCUMENTS

| | | | |
|---|---|---|---|
| 3,258,300 | 6/1966 | Saunders | 73/862.54 X |
| 4,232,547 | 11/1980 | Kasper | 73/862.54 X |
| 4,406,169 | 9/1983 | Ikeuchi et al. | 73/862.54 |
| 4,416,163 | 11/1983 | Yorgiadis | 73/862.65 |

FOREIGN PATENT DOCUMENTS 216325  4/1968  U.S.S.R. ............... 73/862.06

*Primary Examiner*—Anthony V. Ciarlante
*Attorney, Agent, or Firm*—Martin A. Farber

[57] ABSTRACT

A clamping force relates to a clamping-force transducer for rotating clamping devices which has at least two opposite pressure pieces adapted to be placed on the clamping elements of the corresponding clamping device and arranged in a support member, at least one of which pressure pieces acts on a force transducer the measurement values of which are taken from the rotating clamping-force transducer housing via a stationary transfer housing. To adapt the clamping-force transducer simply to clamping devices having a different number of clamping elements and to different clamping diameters without the rigidity of the clamping-force transducer being changed thereby, the pressure pieces are arranged replaceably but fixed on the arms of a multi-arm measurement member, at least one arm of the measurement member being developed as the force transducer. The measurement member preferably has a star shape with six arms, each of which has a connection for a pressure piece. In order to determine the corresponding speed of rotation at the same time as the clamping force, a pulse transmitter for a pulse receiver arranged on the fixed transfer housing is arranged on the rotating clamping-force transducer housing.

16 Claims, 2 Drawing Figures

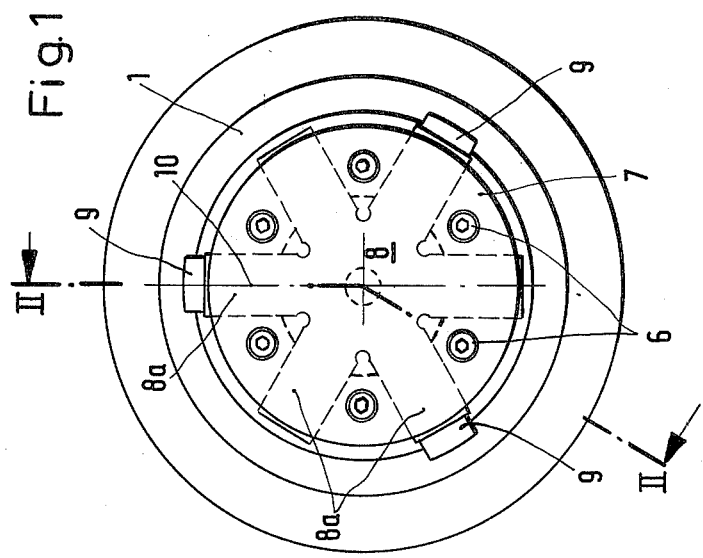
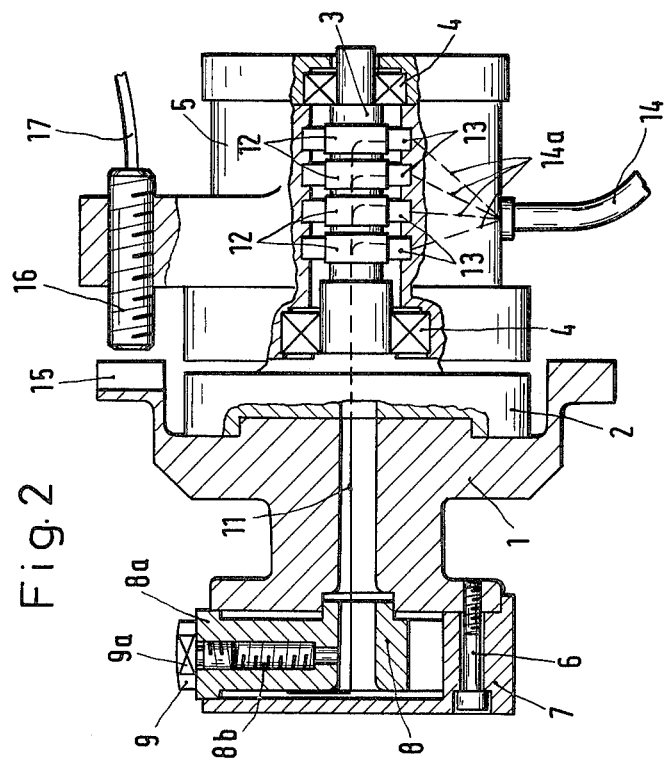

CLAMPING-FORCE TRANSDUCER FOR ROTATING CLAMPING DEVICES

The present invention relates to a clamping-force transducer for rotating clamping devices which has at least two opposite pressure pieces adapted to be placed on the clamping elements of the corresponding clamping device and arranged in a support member, at least one of which pressure pieces acts on a force transducer the measurement values of which are taken from the rotating clamping-force transducer housing via a stationary transfer housing.

Such clamping-force transducers are known for three-jaw chucks. They have three pressure pieces inserted in a support member which rest jointly on a central abutment bolt and are each developed as a force transducer. For this purpose each pressure piece has a plurality of wire strain gauges which are connected to each other by a bridge circuit and each of which measures the clamping force exerted on the pressure piece.

The known clamping-force transducers consist of a large number of individual parts and require considerable technology, which leads to the need for a large amount of space. Additional disadvantages result from the fact that adaptation of the known clamping-force transducers to clamping devices with different numbers of jaws and different clamping diameters is not possible. The decisive disadvantage, finally, resides in the fact that the rigidity of the clamping-force transducer depends decisively on the rigidity of the pressure pieces.

The object of the present invention is to avoid these disadvantages of the known clamping-force transducers and to further develop a clamping-force transducer of the introductory-mentioned type in such a manner that it can be used readily not only for different clamping diameters, but also on clamping devices having a different number of clamping elements and that this can be done without changing the rigidity of the clamping-force transducer.

This objective is solved by the invention by arranging the pressure pieces in replaceable but fixed manner on the arms of a multi-arm measurement member and by developing at least one arm of the measurement member as a force transducer.

By this construction in accordance with the invention the advantage is obtained that, by replacement of the pressure pieces which are arranged fixed on the measurement member, simple adaptation of the clamping-force transducer to different clamping diameters can be effected without the rigidity of the clamping-force transducer being thereby changed. Since the measurement member is developed at the same time as the support member for the pressure pieces, there are only a small number of parts which are required and a small structural volume. The development of the measurement member with a plurality of arms, finally, affords the possibility of using the clamping-force transducer of the invention in clamping devices with different numbers of clamping elements, in which case the defined and constant ridigity of the clamping-force transducer is not changed.

In accordance with another feature of the invention, the measurement member can be developed in a star shape with six arms, each of which is provided with a connection for a pressure piece. In this way it is possible to use the clamping-force transducer optionally for clamping devices having two, three, four and six clamping elements. In particular, the possibility is afforded of measuring the clamping force not only on two- and three-jaw chucks, but also on compensating chucks having six jaws which are developed floating in pairs in order to obtain a compensating clamping.

In order to be able, with the clamping-force measuring device of the invention, to take into account also the influence of the centrifugal force acting on the clamping elements, it is finally proposed by the invention to provide on the rotary housing of the clamping-force transducer a pulse transmitter for a pulse receiver arranged on the stationary transfer housing. In this way the measured clamping forces can be associated directly with the corresponding speed of rotation.

One preferred embodiment of the clamping-force transducer of the invention is shown by way of example in the drawing, in which:

FIG. 1 is an end view of the clamping-force transducer; and

FIG. 2 is a longitudinal section through the clamping-force transducer along the section line II—II of FIG. 1 partially broken away and in section.

The clamping-force transducer for rotating clamping devices has a housing 1 to which there is screwed a bearing flange 2 having a bearing shaft 3. The bearing shaft 3 is mounted by anti-friction bearings 4 for rotation in a transfer housing 5 which can be provided with a handle, not shown in the drawing, for holding the clamping-force transducer.

A supporting member 7 in which a measurement member 8 is arranged is fastened to the front end of the housing 1 by means of screws 6. This measurement member 8 is developed in a star shape with six arms 8a which, in the embodiment shown, extend slightly out of the support member 7. Each arm 8a of the measurement member 8 is provided in the embodiment shown with a threaded bore 8b into which a pressure piece 9 can be screwed. The pressure pieces 9 are provided for this purpose with key surfaces 9a.

At least one arm 8a of the measurement member 8 is developed as a force transducer by means of wire strain gauges 10. In the embodiment shown in the drawing this is the arm 8a which points vertically upward in FIGS. 1 and 2. The wire strain gauges 10 are connected with wiper rings 12, arranged on the bearing shaft 3, by wiring 11 which extends in central bores in the measurement member 8, the housing 1, the bearing flange 2 and the bearing shaft 3. These wiper rings 12 in their turn are connected via wiper-ring collectors 13, arranged in the transfer housing 5, to the wires 14a of a cable 14 so that the wire strain gauges 10 of the measurement member 8 which rotate with the housing 1 are connected in electrically conductive manner to the cable 14.

In order to measure the clamping force exerted by the clamping elements of a rotating clamping device, the clamping-force transducer (one development of which has been described above) is inserted into the clamping device in such a manner that the clamping elements of the clamping device act on the pressure pieces 9 of the measurement member 8. In the embodiment shown in FIGS. 1 and 2, the clamping-force transducer is intended for use in a three-jaw chuck, three of the total of six arms 8a of the measurement member 8 being provided with pressure pieces 9. If the clamping-force transducer, however, is to be used with a two-jaw chuck or a four-jaw chuck, then the pressure pieces 9 are removed from the arms 8a which extend obliquely downwardly in FIG. 1 and instead thereof a pressure piece 9 is placed on the vertically downwardly extending arm 8a which lies opposite the vertically upward pointing arm 8a developed as the force transducer. Since a four-jaw chuck is always a concentrically clamping chuck, only two opposite clamping members are arranged on the measurement member 8. In the event that the clamping-force transducer is to be used to measure the clamping force of a six-jaw chuck, all of the arms 8a are provided with pressure pieces 9.

In all the cases described, that arm 8a of the measurement member 8 which is developed as a force transducer is placed on the clamping element of the clamping device. When this force transducer is acted on by the clamping force exerted by the corresponding clamping element, its value is determined by the wire strain gauge 10 and fed via the wires 11, the wiper rings 12, the wiper-ring collector 13 and the cable 14 to a display device. Since the transfer housing 5 together with the cable 14 is fixed in position while the housing 1 with the support member 7 and the measurement member 8 rotates together with the clamping device, the specific clamping force can be determined even when the clamping devices are rotating, whereby in particular the influence of centrifugal force is detected.

In order to be able to relate these influences of centrifugal force to the specific speed of rotation, a pulse transmitter 15 is developed on the housing 1. This pulse transmitter cooperates with a pulse receiver 16 which is arranged, i.e. fixed, on the transfer housing 5. The speed of rotation determined by the pulse transmitter 15 and the pulse receiver 16 is fed via a pulse line 17 to a subsequent speed display, not shown in the drawing.

From the above it is evident that the clamping-force transducer can, by changing the pressure pieces 9 on the arms 8a of the measurement member 8, be adapted in a simple fashion for the specific purpose of use on clamping devices with different clamping elements. By the selection of pressure pieces 9 of different length, rapid adaptation of the clamping-force transducer to different clamping diameters can be effected in the same manner. The rigidity of the clamping-force transducer thereby remains unchanged since it is determined essentially by the rigidity of the measurement member 8.

We claim:

1. In a clamping-force transducer for rotating clamping devices with clamping elements for measurement of clamping force, which transducer has at least two opposed pressure pieces adapted to be placed on the clamping elements of the corresponding clamping device and arranged in a support member, a rotating clamping-force transducer housing and a stationary transfer housing, at least one of the pressure pieces acting on a force transducer, the measurement values of which are taken from the rotating clamping-force transducer housing via the stationary transfer housing, the improvement comprising
a multi-arm measurement member,
said pressure pieces being arrangeable but fixed on the arms of said multi-arm measurement member facilitating removeable placement of a plurality of pressure pieces in a variety of symmetrically opposed positions on said arms, and
at least one said arm of said measurement member includes said force transducer.

2. The clamping-force transducer according to claim 1, wherein
said multi-arm measurement member has a star shape with six of said arms,
each of said arms has a connection for a corresponding said pressure piece.

3. The clamping-force transducer according to claim 2, wherein
said connection is a threaded bore in said each arm.

4. The clamping-force transducer according to claim 1, further comprising
a pulse transmitter provided on said rotating clamping-force transducer housing,
a pulse receiver arranged on said stationary transfer housing operatively cooperating with said pulse transmitter.

5. The clamping-force transducer according to claim 1, further comprising
a bearing shaft connected to said clamping-force transducer housing and rotatably mounted in said stationary transfer housing, and
wherein said force transducer comprises wire strain gauges,
wiper rings are arranged on said bearing shaft and are connected by wiring with said wire strain gauges, and
wiper-ring collectors arranged in said transfer housing are connected to said wiper rings,
a cable,
wires of said cable are disposed in said transfer housing and are connected to said wiper-ring-collectors,
whereby the wire strain gauges of the measurement member which rotate with the clamping-force transducer housing are connected in electrically conductive manner to said cable.

6. The clamping-force transducer according to claim 1, wherein
said arms extend slightly out of said support member.

7. The clamping-force transducer according to claim 1, wherein
said support member is jointly connected to said rotating clamping-force transducer housing.

8. The clamping-force transducer according to claim 7, wherein
said measurement member is mounted in said support member.

9. A clamping-force transducer for rotating clamping devices, comprising:
a measurement member defining a plurality of arms,
said arms defining a star configuration having opposed arms,
each arm appearing like in configuration, but at least one arm housing a force transducer therein, and
a pressure piece removably affixable on each said arm facilitating removable placement of a plurality of pressure pieces in a variety of symmetrically opposed positions on said arms.

10. The clamping-force transducer according to claim 9, wherein
said multi-arm measurement member has a star shape with six of said arms,
each of said arms has a connection for a corresponding said pressure piece.

11. The clamping-force transducer according to claim 10, wherein
said connection is a threaded bore in said each arm.

12. The clamping-force transducer according to claim 10, further comprising
a support member,
wherein said arms extend slightly out of said support member.

13. The clamping-force transducer according to claim 9, further comprising
- a rotating clamping-force transducer housing,
- a pulse transmittter provided on said rotating clamping-force transducer housing,
- a stationary transfer housing,
- a pulse receiver arranged on said stationary transfer housing operatively cooperating with said pulse transmitter.

14. The clamping-force transducer according to claim 9, further comprising
- a clamping-force transducer housing,
- a stationary transfer housing,
- a bearing shaft connected to said clamping-force transducer housing and rotatably mounted in said stationary transfer housing, and
- wherein said force transducer comprises wire strain gauges,
- wiper rings are arranged on said bearing shaft and are connected by wiring with said wire strain gauges, and
- wiper-ring-collectors arranged in said transfer housing are connected to said wiper rings,
- a cable,
- wires of said cable are disposed in said transfer housing and are connected to said wiper-ring-collectors,
- whereby the wire strain gauges of the measurement member which rotate with the clamping-force transducer housing are connected in electrically conductive manner to said cable.

15. The clamping-force transducer according to claim 9, further comprising
- a rotating clamping-force transducer housing,
- a support member, wherein
- said support member is jointly connected to said rotating clamping-force transducer housing.

16. The clamping-force transducer according to claim 15, wherein
- said measurement member is mounted in said support member.

* * * * *